US010887262B1

(12) United States Patent
Bilotti et al.

(10) Patent No.: US 10,887,262 B1
(45) Date of Patent: Jan. 5, 2021

(54) VISIBILITY FILTERING

(71) Applicant: Twitter, Inc., San Francisco, CA (US)

(72) Inventors: Matthew Bilotti, Oakland, CA (US);
Bonnie Eisenman, Brooklyn, NY (US);
Pulkit Gupta, San Bruno, CA (US);
Don Hoffman, San Francisco, CA (US);
Shannon McCoy, Boulder, CO (US);
Nick Morgan, Louisville, CO (US);
Aziz Michael Batihk, San Francisco, CA (US); Michael Cvet, Piedmont, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/258,443

(22) Filed: Jan. 25, 2019

(51) Int. Cl.
| | |
|---|---|
| *H04L 15/16* | (2006.01) |
| *H04N 1/32* | (2006.01) |
| *G06Q 30/02* | (2012.01) |
| *H04L 12/58* | (2006.01) |
| *G06F 9/54* | (2006.01) |

(52) U.S. Cl.
CPC ............... *H04L 51/12* (2013.01); *G06F 9/54* (2013.01); *H04L 51/32* (2013.01)

(58) Field of Classification Search
CPC . H04W 76/18; H04W 36/0011; H04W 88/18; H04W 76/15; H04W 40/24; H04W 24/04; H04W 76/22; H04W 76/19; H04L 12/66; H04L 45/28
USPC ........................................................ 709/206
See application file for complete search history.

(56) References Cited

U.S. PATENT DOCUMENTS

| | | | |
|---|---|---|---|
| 6,356,555 B1* | 3/2002 | Rakib ................. | H03M 13/256 370/441 |
| 8,000,328 B1* | 8/2011 | Kandekar ............... | A63F 13/35 370/392 |
| 8,209,266 B2 | 6/2012 | Wormald et al. | |

(Continued)

OTHER PUBLICATIONS

Vanetti M., Binaghi E., Carminati B., Carullo M., Ferrari E. (2011) Content-Based Filtering in On-Line Social Networks. In: Dimitrakakis C., Gkoulalas-Divanis A., Mitrokotsa A., Verykios V.S., Saygin Y. (eds) Privacy and Security Issues in Data Mining and Machine Learning. PSDML 2010. Lecture Notes in Computer Science, vol. 6549. Springer, Berlin, Heidelberg, 47 pages.

*Primary Examiner* — David R Lazaro
*Assistant Examiner* — Berhanu Shitayewoldetadik
(74) *Attorney, Agent, or Firm* — Fish & Richardson P.C.

(57) ABSTRACT

Methods, systems, and apparatus, including computer programs encoded on computer storage media, for visibility filtering. One of the methods includes receiving a request for particular data on a social messaging platform; passing the request to one or more services, wherein each service is configured to call to data sources or to additional services to collect the particular data according to a request path defined for a type of request; performing visibility filtering at each service upon obtaining responses to calls made by that service, wherein performing visibility filtering at a service comprises calling a local visibility library that evaluates one or more rules with respect to the obtained response data, and wherein the results of the visibility filtering are passed upstream along the request path until a last service obtains all filtered response data; and assembling a final response to the request based on the filtered response data.

21 Claims, 6 Drawing Sheets

(56) References Cited

U.S. PATENT DOCUMENTS

| | | | | |
|---|---|---|---|---|
| 8,898,151 B2* | 11/2014 | Lee | | G06F 16/335 |
| | | | | 707/723 |
| 10,182,129 B1* | 1/2019 | Peterson | | H04L 41/5009 |
| 2004/0081140 A1* | 4/2004 | Martin | | H04L 47/822 |
| | | | | 370/352 |
| 2006/0099932 A1* | 5/2006 | Smith | | H04W 12/1206 |
| | | | | 455/412.1 |
| 2006/0294192 A1* | 12/2006 | Mao | | H04L 63/102 |
| | | | | 709/213 |
| 2008/0049753 A1* | 2/2008 | Heinze | | H04L 47/726 |
| | | | | 370/392 |
| 2009/0262741 A1* | 10/2009 | Jungck | | H04L 61/1511 |
| | | | | 370/392 |
| 2010/0103837 A1* | 4/2010 | Jungck | | H04L 63/0227 |
| | | | | 370/252 |
| 2010/0185547 A1* | 7/2010 | Scholar | | G06Q 30/0611 |
| | | | | 705/80 |
| 2010/0205152 A1* | 8/2010 | Ansari | | H04W 12/0605 |
| | | | | 707/654 |
| 2010/0318571 A1 | 12/2010 | Pearlman et al. | | |
| 2011/0258635 A1* | 10/2011 | Resende, Jr. | | G06F 9/5038 |
| | | | | 719/313 |
| 2012/0259722 A1* | 10/2012 | Mikurak | | G06Q 50/12 |
| | | | | 705/26.1 |
| 2013/0204934 A1* | 8/2013 | Srivastava | | G06F 9/542 |
| | | | | 709/204 |
| 2014/0006464 A1* | 1/2014 | Pitts | | G06F 12/0804 |
| | | | | 707/827 |
| 2014/0040748 A1* | 2/2014 | Lemay | | G10L 15/1822 |
| | | | | 715/728 |
| 2014/0328387 A1* | 11/2014 | Puri | | H04N 19/122 |
| | | | | 375/240.02 |
| 2016/0036860 A1* | 2/2016 | Xing | | H04L 63/20 |
| | | | | 726/1 |
| 2016/0092598 A1* | 3/2016 | Mishra | | G06F 16/90328 |
| | | | | 707/740 |
| 2016/0306643 A1* | 10/2016 | Klee | | G06F 3/0689 |
| 2017/0061248 A1* | 3/2017 | Ryan, Jr. | | G06K 9/6257 |
| 2017/0180284 A1* | 6/2017 | Smullen | | H04L 63/18 |
| 2017/0286273 A1* | 10/2017 | Lau | | G06F 11/3668 |
| 2018/0123992 A1* | 5/2018 | Yu | | H04L 51/063 |
| 2018/0191867 A1* | 7/2018 | Siebel | | H04L 69/16 |
| 2019/0075013 A1* | 3/2019 | Garcia | | H04L 25/0202 |
| 2019/0098106 A1* | 3/2019 | Mungel | | H04L 67/02 |
| 2019/0130000 A1* | 5/2019 | Balaga | | G06F 16/9535 |

\* cited by examiner

VISIBILITY FILTERING

BACKGROUND

This specification relates to visibility filtering techniques for a social messaging platform. Social messaging platforms and network-connected personal computing devices allow users to create and share content across multiple devices in real-time. Sophisticated mobile computing devices such as smartphones and tablets make it easy and convenient for people, companies, and other entities to use social messaging platforms and applications. Popular social messaging platforms generally provide functionality for users to draft and send messages, both synchronously and asynchronously, to other users. Other common features include the ability to post messages that are visible to one or more identified other users of the platform, or even publicly to any user of the platform without specific designation by the authoring user.

SUMMARY

This specification describes technologies for visibility filtering on a social messaging platform.

A social messaging platform allows users of the social messaging platform to post various content, e.g., messages or profile information, that is visible to one or more other users of the social messaging platform. When a user requests to view particular content posted on the social messaging platform by one or more other accounts, the social messaging platform can determine which content is viewable or not viewable by the requesting account based on applied visibility filtering.

For example, a request for a particular message or information about a particular account can be analyzed to determine whether the requestor is allowed to view the requested information. The request can be assessed by multiple services along a request path that each obtain different data or make further requests from other services. For example, one service can request account information from an account repository while another service can request message information from a message repository.

Rules can be applied using a visibility library located at each service and applied at each stage of the request path. The rules can be used to filter out data that should not be returned to the requesting user. Additional rules can be applied as the data is returned up the stack, e.g., based on the rules that operate on the resulting data collected at that service. Applying relevant rules at each layer of the request path can reduce overall computation by having rules applied to data sets that have already been filtered by other services and by applying rules at the stage in which the information needed to apply the rule has been collected.

Additionally, a visibility service is provided that allows for experimentation, for example, of new visibility rules or existing visibility rules with one or more modified parameters. When a request is identified as part of an experiment, the visibility library at each module can route the request to the visibility service for rule application. This provides a controlled environment for trying different rules or adjusting rule parameters in a way that allows the rules to be easily applied to a group of experiment participants without modifying the overall architecture or negatively impacting other components of the social messaging platform.

In general, one innovative aspect of the subject matter described in this specification can be embodied in methods that include the actions of receiving a request from a user device for particular data on a social messaging platform; passing the request to one or more services, wherein each service is configured to call to data sources or to additional services to collect the particular data according to a request path defined for a type of request; performing visibility filtering at each service of the one or more services upon obtaining responses to calls made by that service, wherein performing visibility filtering at a service comprises calling a local visibility library that evaluates one or more rules with respect to the obtained response data obtained by the service, and wherein the results of the visibility filtering are passed upstream along the request path to a requesting service until a last service obtains all filtered response data; assembling a final response to the request based on the filtered response data; and providing the final response to the user device.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Performing visibility filtering at a local visibility library includes: determining a sequence of rules to be evaluated by the visibility library, wherein the ordering of the sequence is based on a priority assigned to each rule; extracting features associated with the one or more visibility rules from the data collected by the service associated with the request; and evaluating the one or more rules based on the extracted features. The local visibility library determines whether the request is associated with an experiment; and in response to determining that the request is associated with an experiment, passing the rule evaluation for to a visibility service. The request is received by an application programming interface (API) endpoint designated to received requests of a given type and wherein the API endpoint receives a response and visibility data from a service of the one or more services and calls to a visibility library to evaluate one or more additional rules associated with the received response and visibility data. The API endpoint calls to the visibility service to perform auditing of the rule evaluation to determine whether all necessary rules have been evaluated. The request for particular data is a request to view a particular message posted to the social messaging platform; and wherein the visibility filtering is used to determine whether a requesting user is allowed to receive the particular message. The request for particular data is a request to view information about a particular account on the social messaging platform, and wherein the visibility filtering is used to determine whether a requesting user is allowed to receive the requested account information.

The subject matter described in this specification can be implemented in particular embodiments so as to realize one or more of the following advantages. The visibility filtering techniques described in this specification enables a social messaging platform to consolidate visibility metadata in one place such that the social messaging platform can be easily maintained, developed, and experimented. This improves the efficiency of one or more computers to implement the social messaging platform.

In addition, the visibility filtering techniques incorporate rule analysis at several downstack layers of a request path so that some data can be filtered at an earlier stage. Later stages can apply additional rules to a smaller data set based on the downstack filtering. This enables the social messaging platform to use fewer computing resources to process requests.

The visibility filtering techniques also reduce engineering costs to designing and carrying out experiments by simplifying the process for implementing experiments using the visibility service. The visibility service allows experiments to be run on designated users by separately routing the rule evaluations for those users without modifying the current rules sets applied generally. Furthermore, experiments can be implemented by different parts of an organization without requiring modifications to the visibility library by the service operators.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

The social messaging platform can interact with a user by receiving a request from a user device of the user and providing a response responsive to the request to the user device. For example, the request can be a request to view a particular content, e.g., a message or a user account profile on a social messaging platform, and the response can be any suitable content including text, an image, a video, an audio, and a link for an external web site that is responsive to the request.

When the social messaging platform receives the request, the social messaging platform identifies content responsive to the request and applies visibility filtering to the identified content to determine whether certain content should be returned or not. For example, a request may be for a particular message posted to the social messaging platform that belongs to a protected account that only allows certain users to view their message posts. If the requestor is not one of those users, then the request for the message should return an error because the requesting user is not allowed to view the content. Similarly, a request to view a profile associated with that user should also be hidden from users that are not specifically authorized to view the profile for that user account. In another example, a particular message may get flagged by the social messaging platform as violating particular policies. In that case the message should be hidden from view by any requestors.

Figure 1:
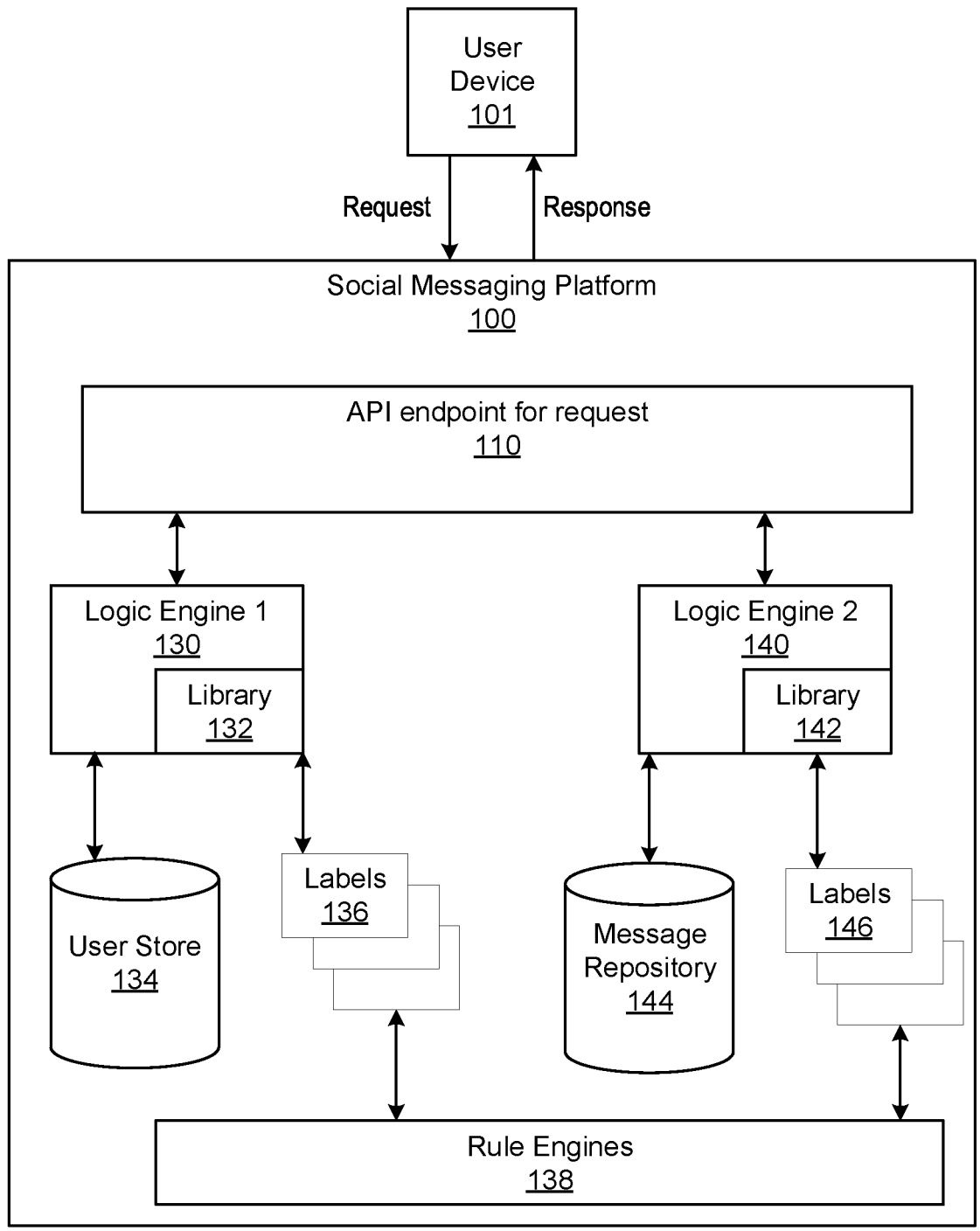
FIG. 1 is a diagram illustrating an example visibility filtering architecture.

FIG. 1 is a diagram illustrating an example visibility filtering architecture. A user device 101 interacts with a social messaging platform 100. For example, the user device 101 can originate a request for particular content from the social messaging platform 100. The request can be, for example, a request for a particular message posted to the social messaging platform by a user account or a request for information about a particular user account, e.g., a request to view a profile associated with an account including messages posted by the account.

FIG. 1 illustrates two different paths for processing two different types of requests, a request for user information and request for a particular message. Each will be described in turn.

The request can be received by an API endpoint 110 for a social messaging platform. The API endpoint takes requests, for example HTTP requests, and then submits the request to the appropriate components for that request. As noted above, FIG. 1 illustrates components for two types of requests: a request for user information and a request for a particular message.

The HTTP request for a particular user may include an identification of an account identifier, for example, by including "screenname=brian" in the request. The HTTP request for a particular message may include an identifier of the message, for example, by including "messageID=12345" in the request.

When a received request corresponds to a request for information about a particular user account, for example a user profile that may include information about the user as well as messages posted by the user, the request is sent to logic engine 130, which generates a response to the request in view of visibility constraints.

The logic engine 130 sends the requested user account identifier, e.g., the screenname identified in the request, to a user store 134. The user store 134 can be an account repository that identifies the accounts on the social messaging platform. If a match is found in the user store 134, a response is provided to the logic engine 130. The response can identify information about the account, for example, an identifier for retrieving profile information about the user account that can in turn be returned to the requesting user.

Before sending the response including the profile information back to the API endpoint 110 for returning to the user device 101, the logic engine 130 runs the username through a library 132. The library 132 applies visibility rules to the username request based on a collection of labels 136. Labels 136 are partially computed visibility decisions made by the social messaging platform at write time and stored for later use in making visibility decisions at read time.

For example, a label may be triggered that requires a particular graph relationship between the user account and a requesting account. If such a relationship exists, then the response is allowed to proceed. However, if such a relationship does not exist, then the requested profile information should not be provided. The library 132 may call additional data sources to perform the evaluation, not necessarily pictured in FIG. 1. For example, a graph repository to determine relevant graph relationships.

Based on the results of the library 132, the logic engine 130 provides a response to the API endpoint 110. If the visibility analysis based on the labels indicates that the response is to be provided, the logic engine 130 provides responsive information about the profile that the API endpoint 110 then provides to the user device 101 as a response to the request. However, if the visibility analysis based on the labels indicates that the requester should not view the requested content, then the logic engine 130 provides a response indicating, for example, that the requested account was not found or that the user does not have permission to view it. This response is then passed to the user device 101 by the API endpoint 110.

A similar visibility analysis can be performed for other types of requests. For example, when a received request corresponds to a request for a particular message posted to the social messaging platform, the request is sent to logic engine 140, which generates a response to the requests in view of the visibility constraints.

For example, instead of the user store 134, the logic engine 140 can send the request to a message repository 144. The message identifier of the request can be used to retrieve the message from the message repository 144. Again, however, the logic engine 140 uses library 142 to apply visibility rules using labels 146. For example, a label may indicate that the message has been flagged as violating a particular policy, e.g., copyright violation or abusive language. In that case, the label is triggered indicating that the message should not be provided in response to the request. Labels can be used to implement other policies to reduce visibility of content identified, for example, as including spam, not safe for work (NSFW) content, child pornography, self-harm, prohibited speech in certain locales (e.g. nazism in Germany), age gating, impersonation, violent threats, non-consensual nudity, doxxing, posting images of the deceased, hate symbols, or inciting violence against groups.

Other actions can occur in response to the triggering of a label besides simply not providing the associated content. For example, in response to a label the system can present "tombstones" to indicate that content has been removed and why as well as notifications to the content authors indicating that the content has been removed and why. Additionally, a triggered label can result in the presentation of a interstitial in front of content informing the viewer that the content may be sensitive or triggering, with the option to click through to the content if they still want to view it.

Similarly to the logic engine 130, the logic engine 140 provides a response based on the application of the labels 146 by library 142 to the API endpoint 110 for delivery to the user device 101. If the labels do not trigger any restrictions, this can include providing the requested message content to the user device 101.

In FIG. 1, the visibility analysis components for different requests use different sets of labels 136 and 146. However, in some implementations, there may only be one set of labels that are applied to requests from different libraries.

Labels can be generated during write time by one or more rule engines 138. These rule engines can be capable of applying heuristics, rules, and trained models to write events e.g., posting a message, modifying an account profile, which may result in the writing of labels for future visibility filtering. For example, during write time, e.g., when a new message is posted to the social messaging platform, the message can be analyzed both synchronously and asynchronously to determine both characteristics of the message as well as applying one or more classifiers, e.g., to determine spam, abuse, or other policy violations. Analysis can be performed for various other write actions including engagements with an existing message or modifications of the user account profile. A label can be generated as a result of the analysis including based on classifier results, rule application, or heuristics. If conditions are satisfied, a label is generated and will be available for use by visibility filtering during subsequent read actions.

For example, a message can include content that flags it as abusive toward a particular individual, e.g., abusive language coupled with an @ reference to a particular account. Once identified, a label is generated such that subsequent attempts to retrieve that message trigger the label and the message is not returned. In some implementations, some threshold number of events are needed to create a label. For example, if an account posts more than a threshold number of messages that violate policy, a label can be applied at the account level that limits visibility of all the messages authored by that account. As an example, a particular write time event can be considered for the creation of one or more labels. In this example, a message is authored by an account to the social messaging platform.

At write time, the message is analyzed synchronously to determine whether the message should be posted. This analysis can include synchronous analysis that applies particular rules, heuristics and classifications before deciding to post the message. If the message should be blocked based on this synchronous analysis, the message is not posted to the social messaging platform. However, other, asynchronous, analysis many not be able to complete within a required time for posting the message. If based on the synchronous analysis, there is no definitive reason to block the message, the message can be posted while the asynchronous analysis continues. If, based on this later asynchronous analysis, the message should not be allowed, a label can be generated that ensures that the next read time request for that message should not return the message.

Figure 2:
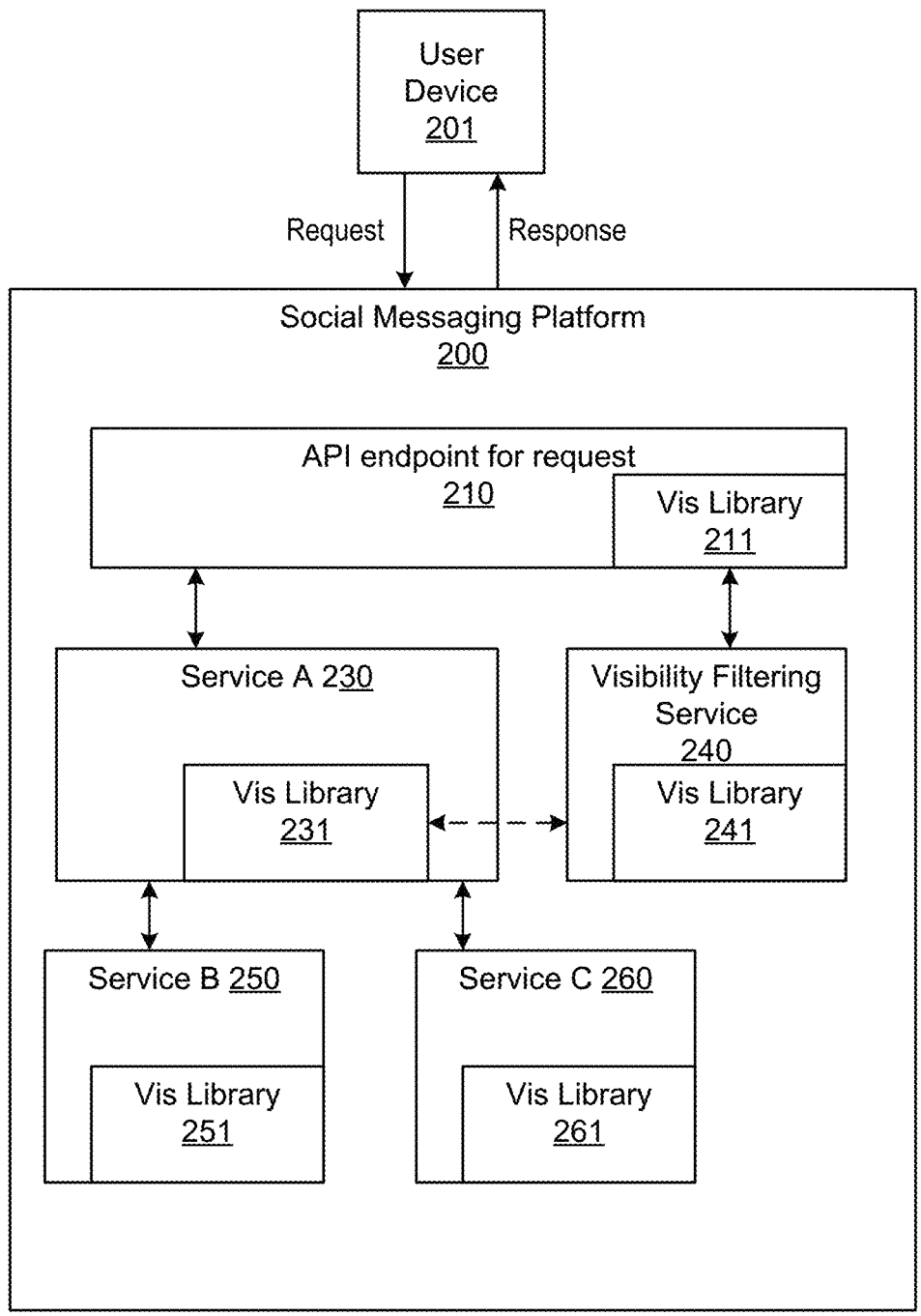
FIG. 2 is a diagram illustrating an example of another visibility filtering architecture.

FIG. 2 is a diagram illustrating an example of another visibility filtering architecture. A user device 201 interacts with a social messaging platform 200. For example, the user device 201 can originate a request for particular content from the social messaging platform 200. The request can be, for example, a request for a particular message posted to the social messaging platform by a user account or a request for information about a particular user account.

The request can be received by an API endpoint 210 used to respond to particular requests, and also apply visibility filtering. The API endpoint 210 takes requests, for example HTTP requests, and then submits the request to the appropriate components that can generate a response to that request. Each component, including the API endpoint 210 includes a respective visibility library for performing visibility filtering operations at each stage in the request path.

The API endpoint 210 provides the request to service A 230. Service A 230 can be configured to compose results to the request from portions provided by other called services. For example, different services can obtain particular portions of the response, which is then combined by service A 230.

In FIG. 2, service A 230 sends parallel downstream requests to service B 250 and service C 260. Service B 250 identifies some content responsive to the received request. For example, service B 250 may identify an account associated with the request from a user store. Service B 250 then calls into a local visibility library 251 to check any relevant rules for the content. The visibility library of service B applies rules that depend on features extracted from the content obtained by service B or other additional downstream calls made by service B, e.g., to additional services not shown.

For example, the visibility library 251 may check rules on whether the requested account is disabled, e.g., for violation of one or more policies. Thus, even though the account was identified by service B 250, it may not be returnable based on the applied rules. If no rules are triggered, the response can be provided back to service A 230 along with visibility data indicating the rules that have been applied by visibility library 251 embedded within service B 250.

Visibility data indicates the visibility filtering state for the request and is preserved across different visibility library invocations along the response path. The visibility data is updated at each invocation of a visibility library associated with the request and ensures that the individual visibility rules are evaluated at most once per request and that the features the rules depend on are extracted at most once per request.

Service C 260 identifies some content responsive to the received request. For example, service C 260 may identify relationship information between the requesting account and the account identified in the request, e.g., from a graph repository. This can indicate, for example, whether the requesting account has a follow relationship with the account identified in the request. Service C 260 similarly calls into a local visibility library 261 to check any relevant rules for the content. The visibility library of service C applies rules that depend on features extracted from the content obtained by service C or other additional downstream calls made by service C, e.g., to additional services not shown.

For example, the visibility library 261 may check rules on whether visibility of the content depends on a particular graph relationship existing between the requesting account and the account identified in the request. For example, the requested account information may only be shown to those accounts having a follow relationship with the requested account. Again, the response is provided back to service A 230 along with visibility data.

Service A 230 has visibility data that reflects changes made by the invocation of the visibility library by service B 250 and by service C 260. Service A 230 then calls into visibility library 231 located at service A 230. The visibility library 231 runs any outstanding visibility rules that have not yet been evaluated by service B or service C, for example, because they depend on features only available at service A. The visibility data is updated based on the applied rules and the results are provided to the API endpoint 210.

The API endpoint 210 also includes a visibility library 211. The API endpoint 210 calls into the visibility library 211, e.g., to perform a final auditing of the visibility results. This final auditing includes calling into a visibility service 240, which checks the visibility data against rules that were expected to be run on the request. If there is a discrepancy, e.g., some expected rules did not run, the visibility service 240 can prevent the requested content from being returned to the requesting user device 201, or can complete the missing rules using its own visibility library 241. For example, if some required rules did not run the API endpoint 210 can return a failure of the request and the user can retry. In some other implementations, the content is allowed to be returned even though there was a determined discrepancy. Additionally, the visibility service 240 can collect the visibility data for further analysis, for example, to identify errors or to refine the application of rules by various visibility libraries, or for auditing purposes.

The visibility service can compare the visibility data at the API endpoint after the request has been processed to what would be expected. This can include rerunning the processes of identifying the rules to apply, described in detail below, and checking that each of these rules has been run. For any rules that have not run, for example because of missing information, the visibility service can choose to evaluate those rules by performing necessary calls to obtain the missing information or can determine to allow the request to proceed without evaluation of that rule. In particular, the visibility service includes visibility library 241 for evaluating rules. Regardless of the choice, the visibility service can log the information so that it can be used for later analysis and improvement of the rule evaluation.

The final result is provided to the user device 201 by the API endpoint 210. If the visibility results indicate that the content can be provided, the API endpoint 210 provides the response to the request, e.g., the account profile for a requested account or a requested message. If the visibility filtering results indicate that the content cannot be provided, the API endpoint 210 provides an error message or indicates that the requesting user account does not have permission to view the requested content.

Visibility Library

Each visibility library, e.g., visibility libraries 231, 241, 251, 261, and 211, provides an interface through which a calling service interacts with a visibility framework. Each visibility library encapsulates a visibility rule engine and its support logic. It also brokers access to the visibility service 240, described in greater detail below. The respective libraries also maintain a corresponding local state of the visibility data. When a visibility library is invoked the first time for an individual request, the visibility data is initialized within the local request context. The visibility data can be updated by the visibility library, e.g., in response to the rule application.

The visibility library evaluates visibility rules. Prior to invoking a visibility rule engine that evaluates the visibility rules, the corresponding service placing the call to the visibility library supplies local features identified from the request or as a result of downstream calls, e.g., a query to a user store or message repository. The features can be provided by value or by "future." Providing by "future" allows some processing to be performed even if waiting for some data, i.e., asynchronous computation. Once the data is obtained, e.g., by downstream calls, the features can be extracted to evaluate the corresponding rule.

In some implementations, the service can pass the content retrieved and the request to the visibility library. The visibility library can then extract all defined features from the provided data. The extracted features are used to update the visibility data based on evaluation of the rules. For example, if an rule is applied based on a feature of an account being a protected account, an "AuthorIsProtected" feature can be stored in the visibility data.

After extracting the features, but prior to executing the local visibility rule engine, the visibility library checks to see if the requesting account is part of an experiment. If the account is part of an experiment, the visibility transfers evaluation of the features to the visibility service as described below.

The visibility rule engine located at each visibility library evaluates one or more rules based on the extracted features. Rules can be prioritized so that computationally expensive rules are ordered after less expensive rules that may short-circuit further evaluation. For example, a rule that indicates that a requested object should not be provided can short-circuit evaluation of other rules since the outcome has been determined. Thus, some request flows can greatly reduce the computation and rule evaluations needed not only at that visibility library but in the upstream evaluation by visibility libraries of other services as well.

Rules may be evaluated in multiple visibility libraries in the request flow. However, rules can be evaluated eagerly as soon as all required features are available. By updating the visibility data at an earlier stage, the system can again reduce overall computation by other services. Rules can be defined over particular fields of content such that some rules can be skipped when the fields are not requested.

The process of identifying and applying a set of visibility rules by the visibility rules engine of a visibility library is described below with respect to FIG. 4.

In some alternative implementations, experiments can be evaluated by individual visibility libraries locally using parameter substitution. If a user is subject to an experiment, the same rules can be run but with a modification to one or more rule parameters that are part of the experiment.

Visibility Service

The visibility service 240 can also be used to evaluate content from one or more of service A 230, service B 250, or service C 260. In particular, at each invocation of a visibility library, e.g., visibility library 231 of service A 230, the visibility library will check whether the requesting user is part of an experiment. For example, one or more rules may be tested on a percentage of users. If the requesting user is assigned to an experiment, the visibility library passes control of the rule evaluation to the visibility service 240. Thus, if a requesting user is in an experiment, all three visibility library calls in services A 230, B 250, and C 260 will redirect to the visibility service 240, which evaluates rules that may involve one or more experimental rules.

The visibility service 240 evaluates the request based on the experiment logic, for example, experimental rules, and provides updated visibility data to the corresponding service, which propagates upstream in the same manner as described above. These experiments can be implemented simply by adding the experimental rules to the visibility service which then applies them to designated accounts included in the experiment. Outcomes can then be compared between the user accounts in the experiment vs. the existing rules applied for those accounts not in the experiment. Test rules that have improved performance, for example, may replace their existing rule counterparts for general use.

Experiments supported by the visibility service 240 can include parameter substitution within a specific visibility rule, replacement of one rule with another rule, modifying the set of rules applicable to a given request, and running arbitrary code within a rule. Parameter substitution involves an experiment that uses a different parameter or parameter value from that defined in a given rule. Parameter substitution has an additional benefit of triggering the experiment only if the experimental rule is responsible for filtering the content. If the content was to be filtered by another rule, then it is unnecessary to trigger the experimental operations. Replacing rules allow for a new or substitute rule to be tested in an experiment.

Typically, unless the requesting user account is part of an experiment, the only calls to the visibility service are at the API endpoint for logging and auditing. However, since the visibility service has the ability to execute rules using its own local visibility library, it can execute any visibility rules that were missed by the services.

The rules applied by the visibility libraries can be executed using labels generated, for example, by rule engines as described with respect to FIG. 1.

Figure 3:
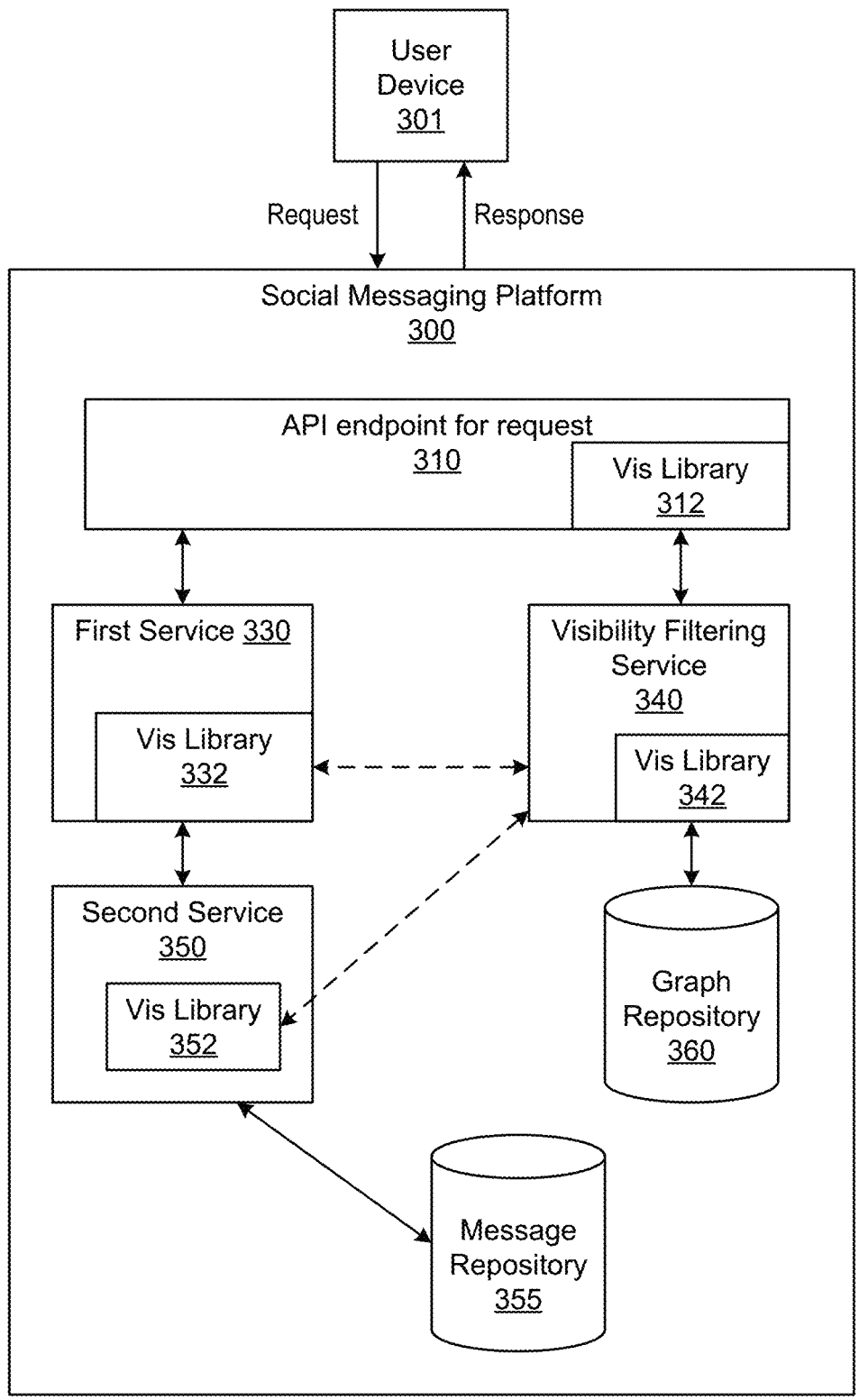
FIG. 3 is a diagram illustrating an example message request flow using a visibility filtering architecture.

FIG. 3 is a diagram illustrating an example message request flow using a visibility filtering architecture. In particular, FIG. 3 illustrates an example scenario of a request for a particular message posted to the social messaging system.

A user device 301 interacts with a social messaging platform 300. For example, the user device 301 can originate a request for particular content from the social messaging platform 300. The request, in this example, is a request for a particular message posted to the social messaging platform by a user account.

The request is received by an API endpoint 310 used to respond to particular requests that, and apply visibility filtering. The API endpoint 310 takes requests, for example HTTP requests, and then submits the request to the appropriate components for that request. The HTTP request for a particular message may include an identifier of the message, for example, by including "messageID=12345" in the request.

The request is sent by the API endpoint 310 to a first service 330, which is configured to generate a response to the type of request and can compose results to the request from content collected by one or more downstream services. For example, different services can obtain particular portions of the response, which is then combined by the first service 330. The first service 330 makes a downstream request to a second service 350.

The second service 350 can receive the message identifier portion of the request. The second service 350 can communicate with a message repository 355 to obtain the requested message. Upon receiving the message corresponding to the request, the second service 350 can call to local visibility library 352 to apply visibility rules associated with the message. For example, the visibility library 352 can execute rules that determine whether the particular message should be shown including rules evaluating whether message has been blocked for violating policy or deleted by the message author. Based on the rules, the visibility data is updated and passed with the content to the first service 330.

If the visibility data indicates that the message should not be provided to the requesting user, the first service 330 does not need to run any additional rules, as the final determination has been made. Consequently, rules that may be more computationally intensive at the visibility library 332 of the first service 330 are not run.

However, if the visibility data indicates that, based on the rules applied by the visibility library 352 of the second service 350, the message can be provided to the requesting user, the first service 330 may call to the local visibility library 332 for further rule application. Now that the content of the message has been obtained, additional features may be extracted and used to apply one or more additional rules. For example, the rules of the visibility library 332 can contain rules that evaluate the author of the retrieved message, e.g., to determine whether the authoring account has been suspended or deleted. If the account should not be visible, then the message authored by that account should not be provided to the requesting user device 301.

Based on the rules, the visibility data is updated and passed with the content to the API endpoint 310. The API endpoint 310 can call to a visibility library 312, which can call to a visibility service 340. The visibility service 340 can perform auditing on the request, for example, to determine whether all applicable rules have been run. They visibility service can also log the information of the visibility data for further analysis.

For example, perhaps a rule was supposed to be run on whether the message privacy settings preclude providing the message to the requesting user based on the graph relationship between the requesting account and the message authoring account. A call to the a graph repository by one of the services, e.g., the second service 350, as part of its rule evaluation may have failed due to some transient issue. The visibility service 340 can run this rule using a local visibility library 342, making necessary downstream requests, e.g., to the graph repository 360, to determine the graph relationship between the viewing and authoring accounts.

If, based on the visibility data and the auditing, all of the rules have been run and the message should be provided, the API endpoint 310 provides the requested message to the user device 301. On the other hand, if the message should not be provided, the API endpoint 310 provides an error message or other response indicating that the message content is not available.

Figure 4:
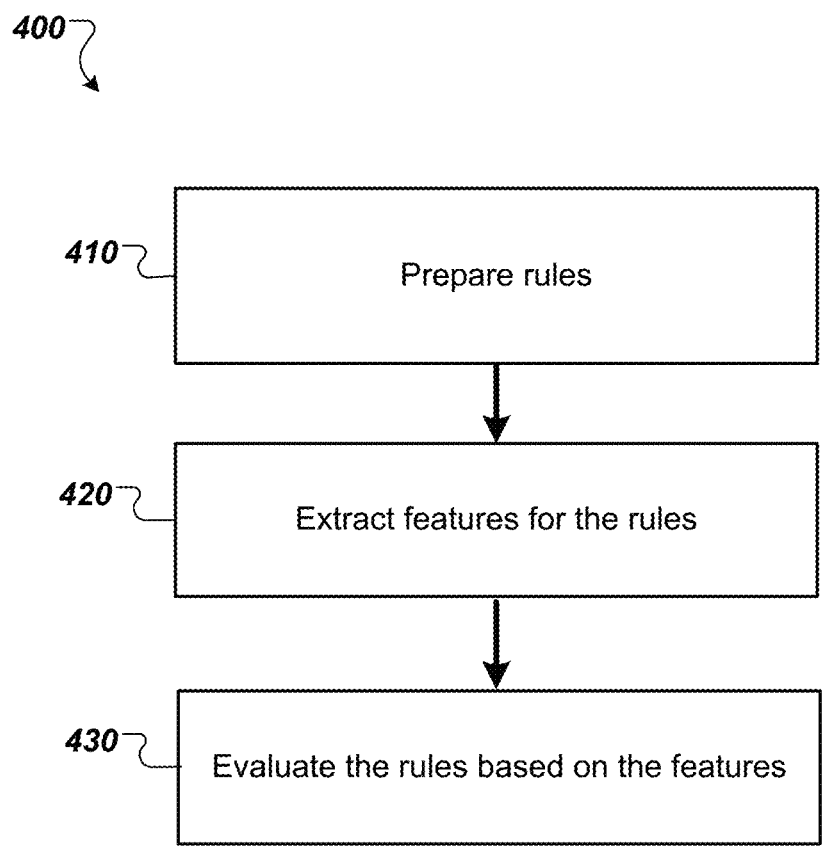
FIG. 4 is a flowchart of an example process for applying visibility rules at a visibility library.

FIG. 4 is a flowchart of an example process 400 for visibility filtering. For convenience, the process 400 will be described as being performed by a system of one or more computers, located in one or more locations, and programmed appropriately in accordance with this specification. For example, a visibility library of a service of a social messaging system, e.g., the social messaging platform 200 of FIG. 2, appropriately programmed, can perform the process 400.

Specifically, the process 400 describes a process for performing visibility filtering by a visibility rule engine of a visibility library. The system performs rule preparation 410. The rule preparation includes identifying a sequence of rules to be evaluated by the particular visibility library. The rules are to be evaluated sequentially based on a priority, e.g., based on whether processing low computationally intensive rules can short-circuit higher computationally intensive rules later in the sequence.

Formally, each rule can be represented by the following function:

(Option[Viewer], ContentId, List[Option[Feature]])=> RuleResult(Action, State)

Each rule has a certain domain of applicability defined by "ContentId", e.g., message, or profile, and "Option[Seq [*Field]]", e.g., bio or birthday. Furthermore, visibility rules can be organized into group around a concept called a visibility surface. Each of the components of the rule are described in turn below.

Viewer: The viewer corresponds to the requesting user account of the social messaging platform that submits a request. In situations where a visibility check is done on behalf of a logged out request, e.g., a request made without logging into an account on the social messaging platform or by someone who is not an account holder, the value for viewer will be "none." Regardless of whether the viewer is a known account, additional features of the request may be available, e.g., an internet protocol (IP) address associated with the request, that can be used in rule analysis.

ContentId: The ContentId is an identifier of the a particular piece of content for which a rule is evaluated. For example, the identifier can be a message identifier, an account identifier, or an identifier for a collection of messages. Each rule applies to a specific type of content.

Feature: A feature is a value derived from one or more of the viewer or the ContentId. In some implementations, feature values can result from responses to downstream services. For example, a request to a graph repository can provide additional features available for use in applying rules. Examples of features include relationships between the viewer and an author of a requested message, e.g., a follow relationship, or that an author account is protected meaning that only designated accounts can view content of the authoring account. Features may often be Boolean valued, but other values are permitted for arbitrary features having arbitrary types, including numbers, strings, and composite structures. Many features are perspectival, meaning that they would have different values depending on whether viewer is set or not, or who the viewer is. For this reason, a feature vector, List[Option[Feature]]], is usable only for one specific request. All rules require at least one feature to evaluate, but all features are optional. When rules cannot be evaluated due to missing feature dependencies, this can be captured in a state of the rule, described below.

RuleResult Action: The first of the two return values of a rule is the action, which represents the result of a successful rule evaluation. An "allow" action is used to indicate that no visibility filtering is to be performed to filter out the response. A "drop" action indicates that the content is to be filtered and not sent to the requesting user device. Drop also permits the system to short-circuit the rule evaluation for that content since it is determined not to be provided. Other values of the RuleResult Action represent product-dependent verbs that tell the caller how to handle the content, e.g., interstitial, downrank, etc. A rule can return at most one non-allow action.

RuleResult State: The second of the two return values of a rule is the state, which indicates whether a rule has been evaluated or not. At the beginning of a visibility library invocation, all rules begin with a state of "pending." Rules that are successfully evaluated will have a state of "evaluated." Error conditions such as missing feature can be represented here as well, some of which are retryable, e.g., in response to missing features being obtained at a later stage or by the visibility service.

*Field.: Optionally, a rule can apply to specific fields of a piece of content, for example a MessageField or a UserField. When a caller, e.g., a particular service, requests filtering over the entire piece of content, all rules that apply to the relevant ContentType are evaluated. When a caller indicates that only certain fields will be rendered, the visibility rule engine will skip rules defined for those fields that the caller has not requested. *Field is a separate identifier representing only those specific fields that have special visibility rules.

Visibility Surface: A visibility surface is how the caller refers to a prioritized sequence of rules defined for a specific ContentType. Multiple visibility surfaces can apply to a specific product surface, and a service may apply a variety of different visibility surfaces depending on the request.

Based on inputs including the visibility surface, contentId, and Option[Seq[*Field]] values, the visibility library collects a sequence of rules to be evaluated in priority order (410). This involves walking the entire Seq[Rule] associated with the visibility surface and omitting those rules not applicable to the requested fields. This can be determined using a static analysis of the rules.

In some implementations, the visibility library generates a rule chain structure that identifies the ordered sequence of rules that apply to the particular visibility surface. Each rule can include a rule identifier that is mapped to a semantic identifier. The corresponding rule for a given identifier can be statically compiled into the visibility rule engine. For example, a rule for a protected account that causes a drop if the requesting user (viewer) does not have a follow relationship can be represented as:

class ProtectedAuthorRule (
  authorIsProtected: Boolean,
  viewerFollowsAuthor: Boolean
extends Rule[Drop] {//Drop being the non-Allow Action
  this Rule can return
  override def evaluate( ): Action={

```
        (authorIsProtected, viewerFollowsAuthor) match {
          case (true, false)=>Drop(ProtectedUser)
          case=>Allow
        }
      }
    }
}
```

After collecting the applicable set or rules, the system extracts features (420). To proceed with rule evaluation, the visibility rule engine needs a feature structure, which can be thought of as a feature vector, containing only those extracted features that will be transported along with the visibility data state. The visibility library provides internal convenience APIs for populating this feature structure from content the calling service may have already, e.g., retrieved information about a message or account, from previous rule evaluation state already in the visibility data, and from downstream calls that may still be made by the visibility library. The feature structure should be as complete as possible, because rules that are missing feature dependencies will not be evaluated by the visibility rules engine.

After collecting the features, the system evaluates the rules (430). The rules are evaluated in priority order until a rule returns a drop action, allowing the computation to short-circuit any remaining rules, or that all rules have been evaluated. Rules can be manually ordered to evaluate drop rules before rules that can return other action types. Rules that cannot be evaluated because of a missing feature or a transient failure are represented with the appropriate rule result state, so that they may be retried on the next invocation, e.g., at an upstream service or by the visibility service.

At the first visibility library invocation along the request path, a visibility data structure is initialized with the viewer, contentID, fields (if any) and visibility surface. The contentID, fields, and visibility surface uniquely identify the sequence of rules that must be evaluated. A visibility rules structure is initialized in which every rule has an "not evaluated" action and a "pending" state. The visibility features vector is initialized using feature values extracted from the calling service.

Figure 5:
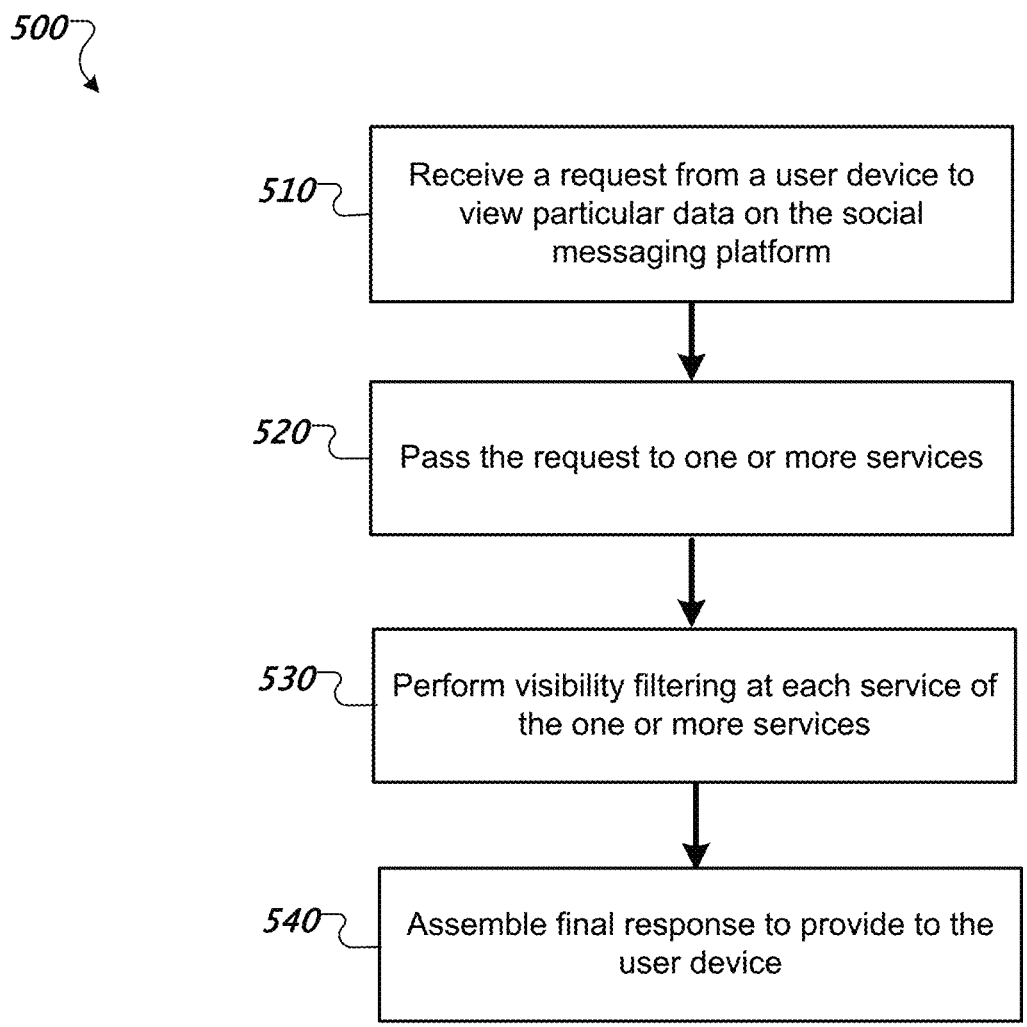
FIG. 5 is a flowchart of an example process for applying visibility filtering to a request to view particular data.

FIG. 5 is a flowchart of an example process 500 for applying visibility filtering to a request to view a particular message. For convenience, the process 500 will be described as being performed by a system of one or more computers, located in one or more locations, and programmed appropriately in accordance with this specification. For example, a social messaging system, e.g., the social messaging platform 200 of FIG. 2, appropriately programmed, can perform the process 500.

The system receives a request from a user device for particular data on the social messaging platform (510). For example, the request can include one or more message identifiers uniquely identifying one or more messages or can include a particular user identifier for an account of the social messaging platform.

The system passes the request to one or more services configured to carry out respective operations to identify results responsive to the request (520). For example, the system can pass the request to services described above with respect to FIG. 2.

The system performs visibility filtering at each service (530). In particular, as described above, each service calls to a local visibility library which evaluates one or more visibility rules on the portion of the response obtained by that service. The results of the visibility filtering are passed upstream, for example, to another service that assembles additional portions of the response or to an API endpoint when all services have completed their respective visibility filtering on the result data.

The system assembles a final response to provide to the user device in response to the request (540). If data responsive to the request has not been filtered out by the respective rule evaluations, the response includes the unfiltered data. For example, the response can include one or more messages that can be rendered on the client device or a profile of a requested user account. However, data that has been filtered out based on the rule evaluation is not provided. If all of the data has been filtered out, then an error or other message indicating that the requested content is not available can be provided to the user device in response to the request.

Figure 6:
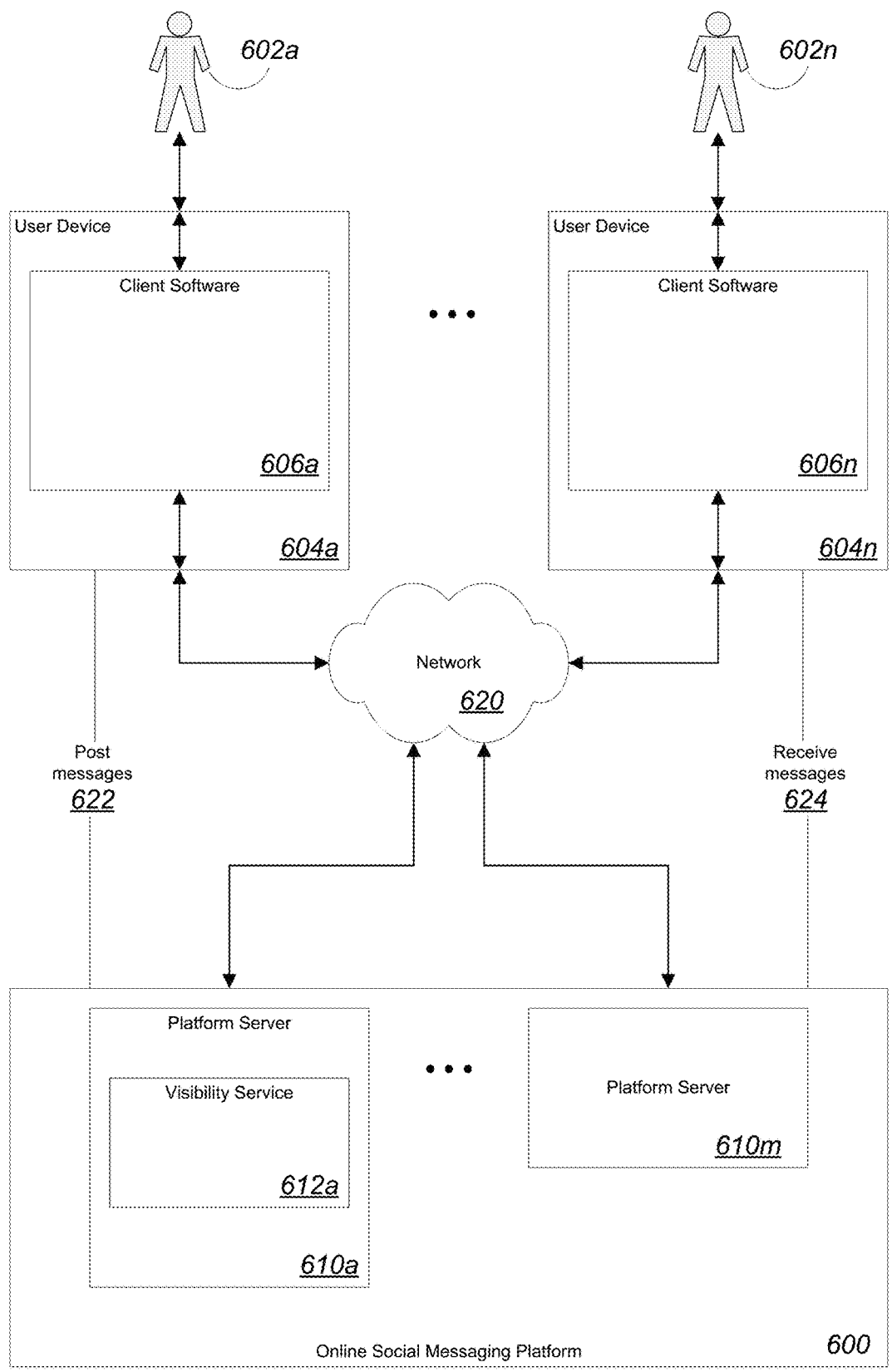
FIG. 6 illustrates an example online social messaging platform and example user devices configured to interact with the platform over one or more data communication networks Like reference numbers and designations in the various drawings indicate like elements.

FIG. 6 illustrates an example online social messaging platform 600 and example user devices 604a-604n configured to interact with the platform over one or more data communication networks 620. The platform, the user devices, or both are configured, as will be described, to implement or perform one or more of the innovative technologies described in this specification.

The platform is implemented on one or more servers 610a-610m. Each server is implemented on one or more computers, e.g., on a cluster of computers. One or more of the servers implement a visibility service 112 of the innovative technologies, described above.

Users

Users 602a-602n of the platform use user devices 604a-604n, on which client software 606a-606n is installed, to use the platform. Users can interact with the social messaging platform using the respective client software on their respective user devices.

A user may be account holder of an account, or an authorized user of an account, on the platform. The platform may have millions of accounts of individuals, businesses, or other entities, e.g., pseudonym accounts, novelty accounts, and so on.

In some implementations, the platform allows use of the platform by users who are not account holders or who are not logged in to an account of the platform. If the platform allows use by such users, the platform may allow such a user to post messages or to use other functionality of the platform by associating the user with a temporary account or identifier.

User Device and Client Software

A user device can be any Internet-connected device, e.g., a laptop or desktop computer, a smartphone, or an electronic tablet. The user device can be connected to the Internet through a mobile network, through an Internet service provider (ISP), or otherwise.

Each user device is configured with software, which will be referred to as a client or as client software 606a-606n, that in operation can access the platform so that a user can post and receive messages, view and curate the user's streams, and view and interact with lists of content items. On any particular user device, the client may be a web browser or an HTML (hypertext markup language) document rendered by a web browser. Or the client may be JavaScript code or Java code. Or the client may also be dedicated software, e.g., an installed app or installed application, that is designed to work specifically with the platform. Or the client may be or include a Short Messaging Service (SMS) interface, an instant messaging interface, an e-mail-based interface, or an API function-based interface, for example.

Platform

The social messaging platform 600 is implemented on one or more computers in one or more locations that operate as one or more servers that support connections over wired or wireless networks 620 from many different kinds of user devices. The platform may have many millions of accounts, and anywhere from hundreds of thousands to millions of connections may be established or in use between clients and the platform at any given moment.

The platform facilitates real-time communication. The platform and client software are configured to enable users to use the platform to post messages 622 to the platform and to use the platform to receive messages 624 posted by other users.

In some implementations, the platform provides facilities for users to send messages directly to one or more other users of the platform, allowing the sender and recipients to maintain a private exchange of messages.

The platform is configured to provide content, generally messages, to a user in a home feed message stream. The messages will generally be messages from accounts the user is following, meaning that the recipient has registered to receive messages posted by the followed account, and optionally content that such accounts have engaged with, e.g., endorsed. Optionally, the platform is configured to include in a recipient user's home feed stream messages that the platform determines are likely to be of interest to the recipient, e.g., messages on topics of particular current interest, as represented by the number of messages posted on the topics platform users, or messages posted on the topics of apparent interest to the recipient, as represented by messages the recipient has posted or engaged with, as well as selected advertisements, public service announcements, promoted content, or the like.

The platform is configured to enable users to exchange messages in real-time, i.e., with a minimal delay. The platform is also configured to enable users to respond to messages posted earlier, on the order of hours or days or even longer. The platform is configured to display posted messages to one or more other users within a short time frame so as to facilitate what can essentially be a live conversation between the users.

Thus, the basic messaging functionality of the platform includes at least posting new messages, providing message streams on client request, managing accounts, managing connections between accounts, messages, and streams, and receiving engagement data from clients engaging with messages. The platform also indexes content items and access data and can provide the indexed data to account holders.

Messages

In some implementations of the platform, a message contains data representing content provided by the author of the message. The message may be a container data type storing the content data. The types of data that may be stored in a message include text, graphics, images, video, and computer code, e.g., uniform resource locators (URLs), for example. Messages can also include key phrases, e.g., hashtags, that can aid in categorizing or relating messages to topics. Messages can also include metadata that may or may not be editable by the composing account holder, depending on the implementation. Examples of message metadata include a time and date of authorship and a geographical location of the user device when it submitted the message. In some implementations, what metadata is provided to the platform by a client is determined by privacy settings controlled by the user or the account holder.

Messages composed by one account holder may reference other accounts, other messages, or both. For example, a message may be composed in reply to another message composed by another account. A message may also be composed by a user in reply to a message originally posted by the user. Messages may also be republications of a message composed by and received from another account. Generally, an account referenced in a message may appear as visible content in the message, e.g., the name of the account, and may also appear as metadata in the message. As a result, the referenced accounts can be interactive in the platform. For example, users may interact with account names that appear in their message stream to navigate to the message streams of those accounts. The platform also allows messages to be private; a private message will only appear in the message streams of the composing and recipient accounts.

In some implementations, messages are microblog posts, which differ from e-mail messages, for example, in that an author of a microblog post does not necessarily need to specify, or even know, who the recipients of the message will be.

Streams

A stream is a stream of messages on the platform that meet one or more stream criteria. A stream can be defined by the stream criteria to include messages posted by one or more accounts. For example, the contents of a stream for a requesting account holder may include one or more of (i) messages composed by that account holder, (ii) messages composed by the other accounts that the requested account holder follows, (iii) messages authored by other accounts that reference the requested account holder, or (iv) messages sponsored by third parties for inclusion in the account holder's message stream. The messages of a stream may be ordered chronologically by time and date of authorship, or reverse chronologically. Streams may also be ordered in other ways, e.g., according to a computationally predicted relevance to the account holder, or according to some combination of time and relevance score.

A stream may potentially include a large number of messages. For both processing efficiency and the requesting account holder's viewing convenience, the platform generally identifies a subset of messages meeting the stream criteria to send to a requesting client once the stream is generated. The remainder of the messages in the stream are maintained in a stream repository and can be accessed upon client request.

Relationships

Accounts will in general have relationships with other accounts on the platform.

Relationships between accounts of the platform are represented by connection data maintained by the platform, e.g., in the form of data representing one or more connection graphs. The connection data may be maintained in a connection repository. A connection graph includes nodes representing accounts of the platform and edges connecting the nodes according to the respective relationships between the entities represented by the nodes. A relationship may be any kind of association between accounts, e.g., a following, friending, subscribing, tracking, liking, tagging, or other relationship. The edges of the connection graph may be directed or undirected based on the type of relationship.

Engagement

In some implementations, the platform tracks engagement with messages. In some implementations, the platform maintains, in a message repository, data that describes each message as well as the engagement with each message.

Engagement data can include any type of information describing user activity related to a message by an engaging account of the platform. Examples of engagement by a user include, for example, reposting the message, marking the message to indicate is a favorite of, liked by, or endorsed by the user, responding to the message, and mentioning or referencing the message. Engagement data may also include how many followers, connections, and/or friends of the context account have connections with the engaging account, e.g., are in a connection graph of the engaging account, or an indication that the context account is a favorite account of the engaging account.

Engagement data can also include any type of information describing activity related to a context account by an engaging account of the platform. A context account is any account that a user, i.e., the engaging account, is engaging with. And engagement data relating to a context account can be data about engagement activity of that account or engagement activity by others with that account.

Services Provided by Platform Servers

The servers of the platform perform a number of different services that are implemented by software installed and running on the servers. The services will be described as being performed by software modules. In some cases, particular servers may be dedicated to performing one or a few particular services and only have installed those components of the software modules needed for the particular services. Some, modules will generally be installed on most or all of the non-special-purpose servers of the platform. The software of each module may be implemented in any convenient form, and parts of a module may be distributed across multiple computers so that the operations of the module are performed by multiple computers running software performing the operations in cooperation with each other. In some implementations, some of the operations of a module are performed by special-purpose hardware.

Front End Services

In some implementations, the platform includes numerous different but functionally equivalent front end servers, which are dedicated to managing network connections with remote clients.

The front end servers provide a variety of interfaces for interacting with different types of clients. For example, when a web browser accesses the platform, a web interface module in the front end module provides the client access. Similarly, when a client calls an API made available by the platform for such a purpose, an API interface provides the client access.

The front end servers are configured to communicate with other servers of the platform, which carry out the bulk of the computational processing performed by the platform as a whole.

Routing Services

A routing module stores newly composed messages in a message repository. The routing module also stores an identifier for each message. The identifier is used to identify a message that is to be included in a stream. This allows the message to be stored only once and accessed for a variety of different streams without needing to store more than one copy of the message.

Relationship Graph Services

A graph module manages connections between accounts. Connections determine which streams include messages from which accounts. In some implementations, the platform uses unidirectional connections between accounts and streams to allow account holders to subscribe to the message streams of other accounts. A unidirectional connection does not necessarily imply any sort of reciprocal relationship. An account holder who establishes a unidirectional connection to receive another account's message stream may be referred to as a "follower," and the act of creating the unidirectional connection is referred to as "following" another account.

The graph module receives client requests to create and delete unidirectional connections between accounts. In some implementations, these connections are stored in a relationship repository as part of a unidirectional connection graph. Each connection in the connection graph repository references an account in the account repository or a stream in the stream repository.

In the same or a different embodiment, the graph module can provide and manage bidirectional connections. In a bidirectional connection, both accounts are considered subscribed to each other's account message streams. The graph module stores bidirectional connections in the relationship repository. In some implementations, the platform and connection graph repository include both unidirectional and bidirectional connections.

Delivery Services

A delivery module constructs message streams and provides them to requesting clients, for example, through a front end server. Responding to a request for a stream, the delivery module either constructs the stream in real time, or accesses from a stream repository some or all of a stream that has already been generated. The delivery module stores generated streams in the stream repository. An account holder may request any of their own streams, or the streams of any other account that they are permitted to access based on security settings including, for example, visibility filtering rules as described above. If a stream includes a large number of messages, the delivery module generally identifies a subset of the messages to send to a requesting client, in which case the remainder of the messages are maintained in a stream repository and sent upon client request.

Account Services

An account module enable account holders to manage their platform accounts. The account module allows an account holder to manage privacy and security settings, and their connections to other account holders.

Generally, the platform does not require the account holder to provide a large amount of personal information. This personal information can include, for example, an account name, which is not necessarily a real name, an identifier, a user name, a picture, a brief description of themselves or the entity, an e-mail address, and a website. The personal information does not necessarily include, and may purposefully exclude, real-world identifying information like age, gender, interests, history, occupation, and so on. Information about each account is stored in an account repository.

Engagement Services

Client software allows account holders receiving a stream to engage, e.g., interact with, comment on, or repost, the messages in the stream. An engagement module receives these engagements and stores them in an engagement repository. Types of engagement include selecting a message for more information regarding the message, selecting a URI (universal resource identifier) or hashtag in a message, reposting the message, or making a message a favorite. Other example engagements types include opening a "card" attached to message, which presents additional content that is a target of a link in the message, or links to an application installed on the user device. Account holders may engage further with the additional content, e.g., by playing a video or audio file or by voting in a poll.

In addition to recording active interactions with messages through explicitly received user device input, the engagement module may also record passive interactions with messages. An impression occurs when a client presents the content of a message on a user device. Impression engagements include the mere fact that an impression occurred, as well as other information, e.g., whether a message in a stream appeared on a display of the user device, and how long the message appeared on the display.

Any engagement stored in the engagement repository may reference the messages, accounts, and/or stream involved in the engagement.

Engagements may also be categorized beyond their type. Example categories include engagements expressing a positive sentiment about a message ("positive engagements"), engagements expressing a negative sentiment about a message ("negative engagements"), engagements that allow an advertiser account to receive monetary compensation ("monetizable engagements"), engagements that are expected to result in additional future engagements ("performance engagements"), or connection engagements that are likely to result in one account holder following another account ("connection engagements"). The negative engagements category includes, for example, engagements dismissing a message or reporting a message as offensive while the positive engagements category typically includes engagements not in the negative engagements category. Example performance engagements include selecting a URL (uniform resource locator) in a message or expanding a card. Example monetizable engagements include, for example, engagements that result in an eventual purchase or a software application install on a user device. Generally, categories and types are not coextensive; a given type of engagement may fall into more than one category and vice versa.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable destination apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) destination, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
receiving a request from a user device associated with a user account for particular data on a social messaging platform;
passing the request to a plurality of services comprising a first service and a second service, wherein each service is configured to call data sources or additional services to collect the particular data according to a request path defined for a type of request;
for each service, of the plurality of services, along the request path beginning with the first service and ending with the second service:
performing visibility filtering at the service upon obtaining responses to calls made by the service, wherein performing visibility filtering comprises calling a local visibility library local to the service that evaluates one or more respective rules with respect to response data obtained by the service, and
passing filtered response data filtered according to the one or more rules of the respective local visibility library for the service along the request path to a next service until the second service obtains filtered response data;
assembling a final response to the request based on the filtered response data filtered according to one or more rules of a local visibility library of the second service; and
providing the final response to the user device as the particular data in response to the request.

2. The method of claim 1, wherein calling the local visibility library local to the service comprises:
determining a sequence of the one or more rules to be evaluated by the local visibility library, wherein the order of services in the sequence is based on a priority assigned to each rule;
extracting features associated with the one or more rules from data collected by the service associated with the request; and
evaluating the one or more rules based on the extracted features.

3. The method of claim 1, further comprising:
determining that the user account is associated with an experiment, wherein the experiment comprises one or more third services each associated with a respective local visibility library that is configured to evaluate rules different than rules of the local visibility libraries of the plurality of services; and
in response to determining that the user account is associated with an experiment, passing the request to the one or more third services of the experiment and performing visibility filtering according to corresponding rules of the one or third more services of the experiment.

4. The method of claim 1, wherein the request is received by an application programming interface (API) endpoint designated to receive requests of a given type and wherein the API endpoint receives response data and visibility data from a service of the plurality of services and calls to a local visibility library local to the service to evaluate one or more additional rules associated with the received response data and visibility data, wherein the visibility data indicates a visibility filtering state for the request.

5. The method of claim 4, wherein the API endpoint calls to the service to perform auditing of the rule evaluation to determine whether all necessary rules have been evaluated.

6. The method of claim 1, wherein the request for particular data is a request to view a particular message posted to the social messaging platform; and
   wherein the visibility filtering is used to determine whether a requesting user is allowed to receive the particular message.

7. The method of claim 1, wherein the request for particular data is a request to view information about a particular account on the social messaging platform, and
   wherein the visibility filtering is used to determine whether a requesting user is allowed to receive the requested account information.

8. A system comprising:
   one or more computers and one or more storage devices storing instructions that are operable, when executed by the one or more computers, to cause the one or more computers to perform operations comprising:
      receiving a request from a user device associated with a user account for particular data on a social messaging platform;
      passing the request to a plurality of services comprising a first service and a second service, wherein each service is configured to call data sources or additional services to collect the particular data according to a request path defined for a type of request;
      for each service, of the plurality of services, along the request path beginning with the first service and ending with the second service:
         performing visibility filtering at the service upon obtaining responses to calls made by the service, wherein performing visibility filtering comprises calling a local visibility library local to the service that evaluates one or more respective rules with respect to response data obtained by the service, and
         passing filtered response data filtered according to the one or more rules of the respective local visibility library for the service along the request path to a next service until the second service obtains filtered response data;
      assembling a final response to the request based on the filtered response data filtered according to one or more rules of a local visibility library of the second service; and
      providing the final response to the user device as the particular data in response to the request.

9. The system of claim 8, wherein calling the local visibility library local to the service comprises:
   determining a sequence of the one or more rules to be evaluated by the local visibility library, wherein order of services in the sequence is based on a priority assigned to each rule;
   extracting features associated with the one or more rules from data collected by the service associated with the request; and
   evaluating the one or more rules based on the extracted features.

10. The system of claim 8, wherein the operations further comprise:
    determining that the user account is associated with an experiment, wherein the experiment comprises one or more third services each associated with a respective local visibility library that is configured to evaluate rules different than rules of the local visibility libraries of the plurality of services; and
    in response to determining that the user account is associated with an experiment, passing the request to the one or more third services of the experiment and performing visibility filtering according to corresponding rules of the one or more third services of the experiment.

11. The system of claim 8, wherein the request is received by an application programming interface (API) endpoint designated to receive requests of a given type and wherein the API endpoint receives response data and visibility data from a service of the plurality of services and calls to a local visibility library local to the service to evaluate one or more additional rules associated with the received response data and visibility data, wherein the visibility data indicates a visibility filtering state for the request.

12. The system of claim 11, wherein the API endpoint calls to the service to perform auditing of the rule evaluation to determine whether all necessary rules have been evaluated.

13. The system of claim 8, wherein the request for particular data is a request to view a particular message posted to the social messaging platform; and
    wherein the visibility filtering is used to determine whether a requesting user is allowed to receive the particular message.

14. The system of claim 8, wherein the request for particular data is a request to view information about a particular account on the social messaging platform, and
    wherein the visibility filtering is used to determine whether a requesting user is allowed to receive the requested account information.

15. One or more non-transitory computer-readable storage media encoded with instructions that, when executed by one or more computers, cause the one or more computers to perform operations comprising:
    receiving a request from a user device for particular data on a social messaging platform;
    passing the request to one or more services, wherein each service is configured to call to data sources or to additional services to collect the particular data according to a request path defined for a type of request;
    receiving a request from a user device associated with a user account for particular data on a social messaging platform;
    passing the request to a plurality of services comprising a first service and a second service, wherein each service is configured to call data sources or additional services to collect the particular data according to a request path defined for a type of request;
    for each service, of the plurality of services, along the request path beginning with the first service and ending with the second service:
       performing visibility filtering at the service upon obtaining responses to calls made by the service, wherein performing visibility filtering comprises calling a local visibility library local to the service that evaluates one or more respective rules with respect to response data obtained by the service, and
       passing filtered response data filtered according to the one or more rules of the respective local visibility library for the service along the request path to a next service until the second service obtains filtered response data;
    assembling a final response to the request based on the filtered response data filtered according to one or more rules of a local visibility library of the second service; and
    providing the final response to the user device as the particular data in response to the request.

16. The one or more non-transitory computer-readable storage media of claim 15, wherein calling the local visibility library local to the service comprises:
  determining a sequence of the one or more rules to be evaluated by the local visibility library, wherein order of services in the sequence is based on a priority assigned to each rule;
  extracting features associated with the one or more rules from data collected by the service associated with the request; and
  evaluating the one or more rules based on the extracted features.

17. The one or more non-transitory computer-readable storage media of claim 15, wherein the operations further comprise:
  determining that the user account is associated with an experiment, wherein the experiment comprises one or more third services each associated with a respective local visibility library that is configured to evaluate rules different than rules of the local visibility libraries of the plurality of services; and
  in response to determining that the user account is associated with an experiment, passing the request to the one or more third services of the experiment and performing visibility filtering according to corresponding rules of the one or more third services of the experiment.

18. The one or more non-transitory computer-readable storage media of claim 15, wherein the request is received by an application programming interface (API) endpoint designated to receive requests of a given type and wherein the API endpoint receives response data and visibility data from a service of the plurality of services and calls to a local visibility library local to the service to evaluate one or more additional rules associated with the received response data and visibility data, wherein the visibility data indicates a visibility filtering state for the request.

19. The one or more computer-readable storage media of claim 18, wherein the API endpoint calls to the service to perform auditing of the rule evaluation to determine whether all necessary rules have been evaluated.

20. The one or more non-transitory computer-readable storage media of claim 15, wherein the request for particular data is a request to view a particular message posted to the social messaging platform; and
  wherein the visibility filtering is used to determine whether a requesting user is allowed to receive the particular message.

21. The one or more non-transitory computer-readable storage media of claim 15, wherein the request for particular data is a request to view information about a particular account on the social messaging platform, and
  wherein the visibility filtering is used to determine whether a requesting user is allowed to receive the requested account information.

* * * * *